Patented Apr. 11, 1933

1,903,626

UNITED STATES PATENT OFFICE

FINN JOHNSEN, OF FUUR, DENMARK

REMEDY FOR COMBATING PLANT DISEASES AND FOR THE PROTECTION OF PLANTS AGAINST ATTACKS FROM FUNGI AND INSECTS

No Drawing. Application filed September 8, 1928, Serial No. 304,840, and in Germany September 12, 1927.

For the abatement of plant diseases and for the protection of plants against attacks from fungi and insects, various metal salts, as is well known, have largely been used, the said salts being either sprayed in watery solution over the plants or spread over the plants in dry state and mixed with suitable finely divided substances such as lime, calcined gypsum, alkali carbonates and the like.

The application of protective remedies in dry state involves the advantage over the application of the same in watery solution that it is feasible, by suitable selection of the additional substances with which the metal salt is mixed, to obtain a material reduction as to volume of the quantity of substance to be applied to a certain area in order to give the same protection as a metal salt applied in watery solution.

A volumetric reduction of the total quantity of substance to be applied per unit area will generally—provided that it is not accompanied by a corresponding increase of the specific gravity of the substance—mean a reduction of the work and labor costs of applying the substance.

Most of the heretofore proposed protective remedies applied in dry state are either of high specific gravity or require the addition of special adhesive substances such as sugar, casein, resins, tar and the like, which render the substance more expensive, and which may form, on the epidermis of the plants, a film which partly impedes the respiration of the plant and partly prevents the protective remedy from penetrating into the tissue of the plant.

The present invention has for its object to produce a protective remedy adapted to be applied in dry state, and of which there is required, per unit area, a considerably smaller quantity by weight than of any heretofore known protective remedy.

According to the present invention, such a protective remedy is a mixture of "moler" (a naturally-occurring mixture of clay and diatomaceous earth) and a substance efficient in respect to the protection aimed at, but otherwise of known nature, for instance a copper salt or some other inorganic compound, and the invention is founded on the theory that moler posseses to a far higher degree than any substance heretofore used in connection with protective remedies, the ability to absorb metal salts etc., for instance copper sulphate, and to give off the metal salts gradually to the vegetable tissue exactly at the rate necessary and sufficient to attain the desired protection.

The naturally occurring moler itself possesses a sufficiently high adhesive power to cause the substance which is active against plant diseases to cling to the plants for a long while, even during rainy weather.

The mixture of moler and the substance active in respect to the protection desired is communicated so far that the mixture in dry state may be blown or sprinkled over the plants. By addition of some alkali, for instance lime or the like, the mixture is rendered alkaline in cases where this might be required. The mixture may suitably be comminuted so far that the main part of the mixture, by being blown out during still weather, will remain suspended like a cloud of fog for some appreciable period, for instance one half or one minute.

Experience has shown it to be practicable to use a mixture of moler and, for instance, a metal salt, in which mixture the percentage of metal salt is far higher than in the heretofore used dry or wet abating and protective means. Thus, whereas, a neutralized watery solution of copper sulphate of about 2% has heretofore been used, for example, for abatement of attacks from fungi, according to the present invention there may be used a neutralized mixture containing more than 15% of copper sulphate, without the plants themselves being injured by the copper sulphate, in spite of the fact that the latter is present in far higher percentages than in those mixtures which it has heretofore been practicable to use.

If to a given area it has been necessary to apply, for instance, a solution of 12 to 14 lbs. of copper sulphate in 700 lbs. of water and, according to the heretofore-known dry methods of application, to use the same quantity of copper sulphate mixed with about 160 lbs. of lime, then according to the present process with the same quantity of copper sulphate it will only be necessary to apply a total quantity by weight not exceeding 70 lbs., out of which 10 or even 15 lbs. will be the alkali used for neutralizing.

Having now particularly described and ascertained the nature of my said invention and in what manner the same is to be performed, I declare that what I claim is:—

1. A remedy for abating plant diseases and for protecting plants against attacks from fungi and insects, comprising a mixture of moler and inorganic metal salts.

2. A remedy for abating plant diseases and for protecting plants against attacks from fungi and insects, comprising a mixture of moler and an inorganic copper salt.

3. A remedy for abating plant diseases and for protecting plants against attacks from fungi and insects, comprising a mixture of moler and copper sulphate.

4. A remedy for abating plant diseases and for protecting plants against attacks from fungi and insects, comprising a mixture of moler and copper sulphate and an alkali.

5. A remedy for abating plant diseases and for protecting plants against attacks from fungi and insects, comprising 1 part of copper sulphate and 3 or more parts of moler, and an amount of alkali sufficient to render the mixture neutral or alkaline.

6. A remedy for abating plant diseases and for protecting plants against attacks from fungi and insects, comprising a mixture of moler and a metal salt and an alkali, the said mixture being so finely comminuted that it may be blown out over the plants like a cloud of fog, and in still atmospheric air will remain suspended in the air for a period of time not less than half a minute.

In testimony whereof he affixes his signature.

FINN JOHNSEN.